(12) United States Patent
Rines et al.

(10) Patent No.: US 12,019,230 B2
(45) Date of Patent: Jun. 25, 2024

(54) SYSTEM AND METHOD FOR A PRECISION VARIABLE FOCUS TELESCOPE

(71) Applicant: BAE Systems Information and Electronic Systems Integration Inc., Nashua, NH (US)

(72) Inventors: Nathan E. Rines, Hollis, NH (US); Heather L. Keegan, Bedford, NH (US); Kevin A. LaRochelle, Goffstown, NH (US); Paul F. Messier, Brookline, NH (US); Stephen J. Pond, Ayer, MA (US); Michael J. Powers, Amherst, NH (US); Glen A. Rines, Hollis, NH (US); Donald K. Smith, Rye, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 474 days.

(21) Appl. No.: 16/915,386

(22) Filed: Jun. 29, 2020

(65) Prior Publication Data
US 2020/0409135 A1 Dec. 31, 2020

Related U.S. Application Data

(60) Provisional application No. 62/867,412, filed on Jun. 27, 2019.

(51) Int. Cl.
*G02B 23/00* (2006.01)
*G02B 7/02* (2021.01)
(Continued)

(52) U.S. Cl.
CPC ............. *G02B 23/06* (2013.01); *G02B 7/028* (2013.01); *G02B 23/16* (2013.01)

(58) Field of Classification Search
CPC ........ G02B 23/00; G02B 23/06; G02B 23/16; G02B 23/2476; G02B 23/2484;
(Continued)

(56) References Cited

U.S. PATENT DOCUMENTS 3,887,788 A * 6/1975 Seibel .................... H05B 3/845
392/435
6,404,547 B1 6/2002 Hull
(Continued)

FOREIGN PATENT DOCUMENTS

KR    10-2001-0039856    *   5/2001

*Primary Examiner* — Thong Q Nguyen
(74) *Attorney, Agent, or Firm* — Scott L. Asmus; Gary McFaline

(57) ABSTRACT

A system and method are disclosed for a precision variable-focus telescope that includes a telescope housing containing an optical system; a gap pad including a first side and a second side, wherein the first side of the gap pad is attached to the telescope housing; a heat spreader including a first side and a second side, wherein the heat spreader is contiguous with the telescope housing and wherein the second side of the heat spreader is attached to the second side of the gap pad; a temperature-sensing device connected to the first side of the heat spreader; and an electric-film heater including a first side and a second side, wherein the second side of the electric-film heater is attached to the first side of the heat spreader.

18 Claims, 7 Drawing Sheets

(51) Int. Cl.
*G02B 23/06* (2006.01)
*G02B 23/16* (2006.01)

(58) Field of Classification Search
CPC ...... G02B 23/2492; G02B 7/00; G02B 7/008; G02B 7/028; G02B 7/181
USPC .......................................... 359/399–435, 820
See application file for complete search history.

(56) References Cited

U.S. PATENT DOCUMENTS

| | | | |
|---|---|---|---|
| 6,866,391 B2 * | 3/2005 | Krausse | G02B 7/008 |
| | | | 359/512 |
| 8,817,392 B2 | 8/2014 | Oskotsky et al. | |
| 9,207,434 B2 | 12/2015 | Staver | |
| 9,532,486 B1 * | 12/2016 | Hinkle | H05K 7/20409 |
| 2011/0228484 A1 * | 9/2011 | Sundstrom | H01L 23/36 |
| | | | 29/832 |
| 2013/0341315 A1 * | 12/2013 | Blank | G01K 13/20 |
| | | | 219/494 |
| 2014/0328563 A1 * | 11/2014 | DeMeritt | G02B 6/4268 |
| | | | 385/100 |
| 2018/0130733 A1 * | 5/2018 | Richard | H01L 24/11 |
| 2019/0082945 A1 * | 3/2019 | Eubanks | A61B 1/00135 |

* cited by examiner

SYSTEM AND METHOD FOR A PRECISION VARIABLE FOCUS TELESCOPE

CROSS REFERENCE TO RELATED APPLICATIONS

This application claims the benefit of U.S. Provisional Patent Application Ser. No. 62/867,412 filed Jun. 27, 2019, which is herein incorporated by reference in its entirety for all purposes.

STATEMENT OF GOVERNMENT INTEREST

This invention was made with government support under a classified Sub-Contract, awarded by a classified Federal agency. The government has certain rights in this invention.

FIELD

The present disclosure relates generally to telescopes. More particularly, the disclosure relates to a telescope with a temperature-based variable-focus.

BACKGROUND

Telescopes can be exposed to extreme temperatures. The optical performance (e.g. focus) of a telescope's optical system can change with small temperature variations. Maintaining a stable, focus in extreme temperatures and during temperature variations in the environment is important for the survival and image quality of the optics.

Athermalization of the optical system stabilizes the focus in extreme and fluctuating temperatures. Traditionally, passive athermalization is used to allow the optical system to expand and contract with fluctuations in the ambient temperature to maintain focus within an acceptable range. Passive athermalization involves designing a telescope such that the key material properties with strong temperature dependence largely cancel each other out. Specifically, the thermo-optical coefficient (refractive index change over temperature) of the lenses and the coefficient of thermal expansion of both the lenses and the housing are designed in such a way that as temperature changes, focus of the telescope as a whole is maintained. However, depending on the design constraints of the telescope, including but not limited to suitable materials for lenses and housings, the ambient environment of the telescope, and the overall design, the error rate of the focus with passive athermalization may be too high for certain applications. In addition, the manufacturing requirements for passive athermalization can be overly complex, especially for the degree of athermalization required for certain harsh environments.

SUMMARY

Accordingly, there is a need for a telescope optical system to maintain a diffraction-limited performance when passive athermalization cannot effectively be utilized. Additionally, there is a need for a telescope having a high-precision, electronically controlled focus-adjustment mechanism when the telescope is located in a space that is not readily accessible.

An example embodiment of the present disclosure provides a system for a precision variable-focus telescope that includes a telescope housing, wherein the telescope housing contains an optical system; a gap; a heat; a temperature-sensing device connected to the first side of the heat spreader; and a heater attached to the first side of the heat spreader.

An example embodiment of the present disclosure provides a system for a precision variable-focus telescope that includes a gap pad attached to a telescope housing, wherein the telescope housing contains an optical system; a heat spreader contiguous with the telescope housing; a temperature-sensing device; and an electric heater attached to the first side of the heat spreader.

Particular implementations may include one or more of the following features. The gap pad may include a material with a low thermal impedance. The second side of the electric heater may be attached to the first side of the heat spreader by a pressure-sensitive adhesive. The gap pad may be contiguous with the heat spreader. The heat spreader may include aluminum. The electric heater may include a polyimide foil. The gap pad may surround the telescope housing. The electric heater may be contiguous with the heat spreader. The temperature-sensing device may include a thermistor. The temperature-sensing device can be located on the heat spreader or elsewhere on the telescope housing. The heat spreader may surround the telescope housing.

Particular implementations may include one or more of the following features. The precision variable-focus telescope may include a gap pad, wherein the gap pad may be sandwiched between the telescope housing and the second side of the heat spreader. The gap pad may include a material with a low thermal impedance. The second side of the electric-film heater may be attached to the first side of the heat spreader by a pressure-sensitive adhesive.

An example embodiment of the present disclosure provides a system for a precision variable-focus telescope heating mechanism control loop including a heat spreader; a temperature-sensing device attached to the heat spreader; a field programmable gate array (FPGA); a proportional/integral controller (PID controller) implemented within the FPGA; and a switching power, wherein the input of the switching power supply receives the output signal from the PID controller; wherein the switching power supply output regulates the voltage across the heat spreader and controls the power applied to the heat spreader, maintaining the telescope at a desired temperature to achieve diffraction-limited performance.

An example embodiment of the present disclosure provides a system for a precision variable-focus telescope heating mechanism control loop including a heat spreader; a temperature-sensing device attached to the heat spreader; a field programmable gate array (FPGA); a proportional/integral controller (PID controller) implemented within the FPGA; and a linear power supply including an input and output, wherein the input of the linear power supply receives the output signal from the PID controller; wherein the switching power supply output regulates the voltage across the heat spreader and controls the power applied to the heat spreader, maintaining the telescope at a desired temperature to achieve diffraction-limited performance.

An example embodiment of the present disclosure provides a method for the fine adjustment of the optical system in a precision variable-focus telescope that includes observing defocus (wavefront error) as a function of temperature; adjusting the course adjustment of the telescope optical system to desired focus; adjusting the heater driver set point temperature for fine adjustment of the telescope optical system; and maintaining the heater driver set point temperature for diffraction-limited performance over a wide temperature environment.

Particular implementations may include one or more of the following features. The method for the fine adjustment of the optical system in a precision variable-focus telescope may include characterizing the temperature of the telescope using a heater circuit over a defined temperature range.

Implementations of the techniques discussed above may include a method or process, a system or apparatus, a kit, or a computer software stored on a computer-accessible medium. The details of one or more implementations are set forth in the accompanying drawings and the description below. Other features will be apparent from the description and drawings, and from the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are intended to be drawn to scale. For purposes of clarity, not every component may be labeled in every drawing.

DETAILED DESCRIPTION

The present disclosure relates to the fine adjustment of telescope optical systems. More particularly, a telescope optical system with a temperature-based variable focus. The following description focuses on variable-focus telescopes capable of precision tuning of the fine focus while minimizing wave front error and without the need for mechanical actuation or movement of any lens elements within the telescope. The adjustment and determination of a desired telescope focus using a digital controller facilitates diffraction-limited performance over a wide temperature environment. Unlike passive athermalization, the thermo-optical coefficients are specifically chosen such that the optical system (i.e. telescope) has a known, non-zero, linear relationship between the defocus and temperature. This non-zero linear relationship between defocus and temperature allows precision control of the focus of the system through use of a thermal control loop. In other words, designing for this linear, but non-zero relationship allows for precision control of the focus of the optical system (i.e. telescope) that is not possible in state of the art designs. Various embodiments of the present disclosure will be described herein.

In one embodiment, the telescope may be used as a stand-alone telescope. In an alternative embodiment, the telescope may be used in a larger optical system. Adjustment of the telescope through temperature control can be used to correct the defocus in a larger system where a telescope is used with additional external optics. The desired focus of a telescope, or a larger system including a telescope, can be maintained through a wide range of ambient temperatures. In various embodiments, heaters and heat spreaders are attached to a telescope, and in combination with a control loop, the telescope temperature remains constant even as ambient air conditions around the telescope vary.

Figure 1:
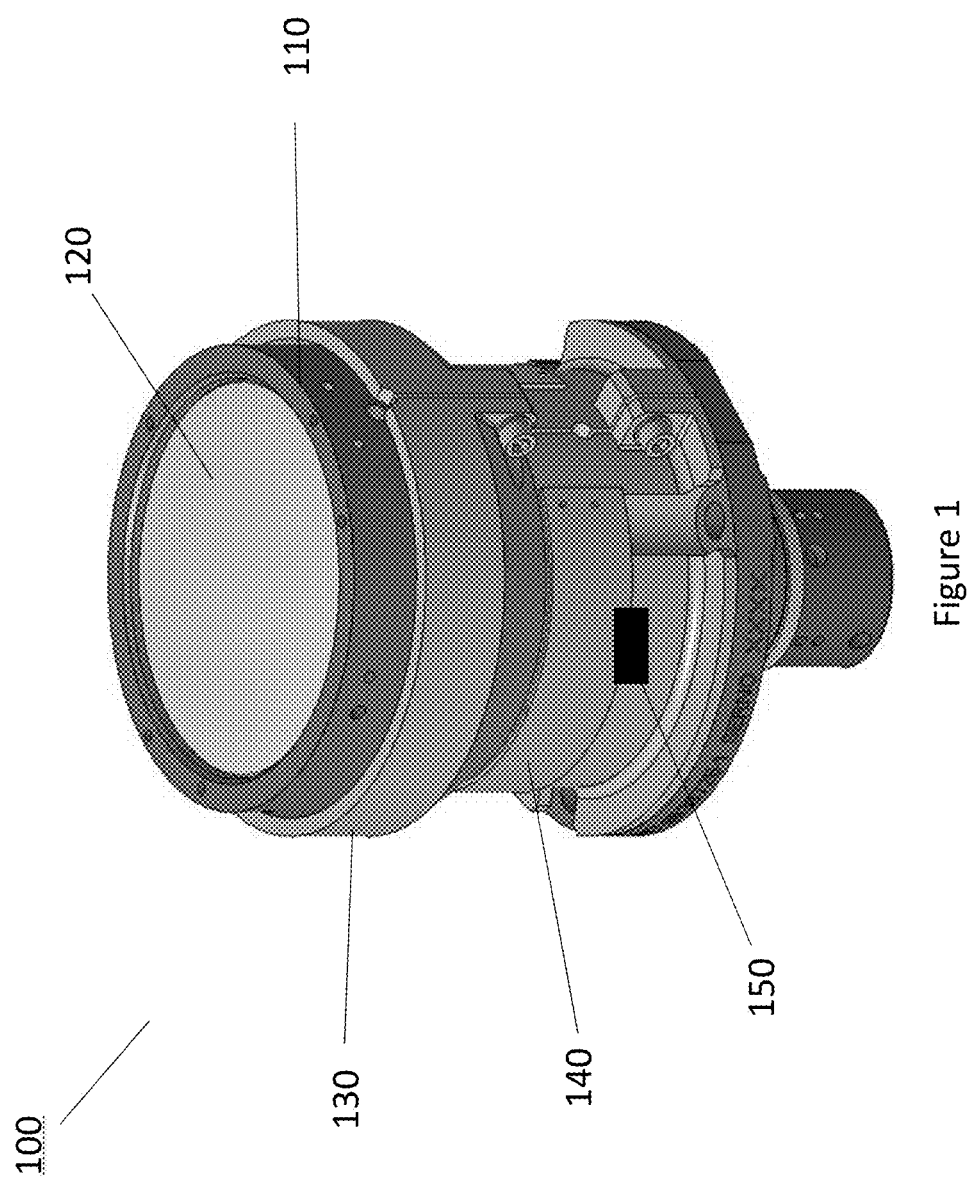
FIG. 1 is a perspective view of a precision variable-focus telescope according to one embodiment.
Figure 2:
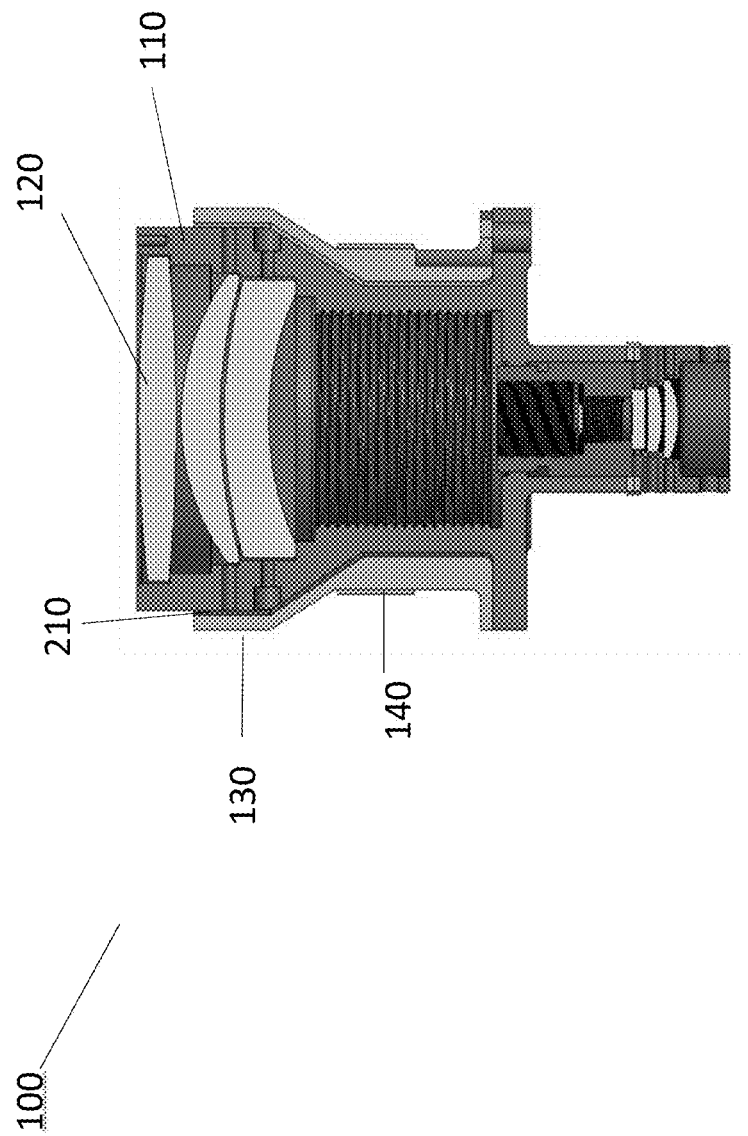
FIG. 2 is a cross-sectional view of a precision variable-focus telescope according to one embodiment.

Now turning to FIG. 1 and FIG. 2, therein is shown a precision variable-focus telescope 100 that has a telescope housing 110 and an optical system 120. By way of example, the telescope housing 110 may be comprised of titanium. A heat spreader 130 is attached or coupled to the telescope housing 110 either directly or indirectly. In one embodiment, the heat spreader 130 surrounds the telescope housing 110. Additionally, the heat spreader 130 may be contiguous with the periphery of the telescope housing 110. The heat spreader 130 may be one piece in one embodiment. In another embodiment, the heat spreader 130 may be machined in at least two parts. The heat spreader 130 parts may be connected or coupled by any suitable method, including but not limited to, screws, adhesives, and welds. By way of example, the heat spreader 130 may be comprised of aluminum.

At least one heater 140 is attached to the heat spreader 130 to regulate temperature of the precision variable-focus telescope 100. The heater 140 can be spread along sections of the heat spreader 130 and in patterns such as strips or rows to allow for effective heating. In one embodiment, the heater 140 is an electric-film heater that is contiguous with the heat spreader 130. The electric-film heater 140 has a resistance element to evenly heat the heat spreader 130. By way of example, the electric-film heater 140 may be comprised of polyimide foil. In one embodiment, the electric-film heater 140 is attached to the heat spreader 130 by pressure-sensitive adhesive. The composition of the adhesive should not interfere with the heating of the heat spreader 130. Other attachment mechanisms of the film heater 140 to the heat spreader 130 include screws, pins and posts.

In this example, at least one temperature-sensing device 150 is attached to the heat spreader 130 either directly or indirectly. The temperature-sensing device 150 may also be mounted elsewhere on the telescope. The temperature-sensing device 150 measures the temperature of the telescope 100. By way of example, the temperature-sensing device 150 may comprise a thermistor. In one example the temperature-sensing device 150 is located away from the heater 140. In another example there are multiple temperature-sensing device 150. According to one embodiment a temperature calibration table is used such a temperature of the telescope 100 is or any location thereof is established by knowing the temperature at the temperature-sensing device 150.

Turning now to FIG. 2, therein is shown a cross-sectional view of a precision variable-focus telescope 100 that has a telescope housing 110 and an optical system 120. In one embodiment, a gap pad 210 is sandwiched between the telescope housing 110 and the heat spreader 130. The gap pad 210 fills in the empty space between the heat spreader 130 and telescope housing 110 to evenly heat the telescope housing 110. In various embodiments, the gap pad 210 may be contiguous with the telescope housing 110 and the heat spreader 130. By way of example, the gap pad 210 may be comprised of a material with a low thermal impedance to transfer heat from the heat spreader 130 to the telescope housing 110.

Figure 3A:
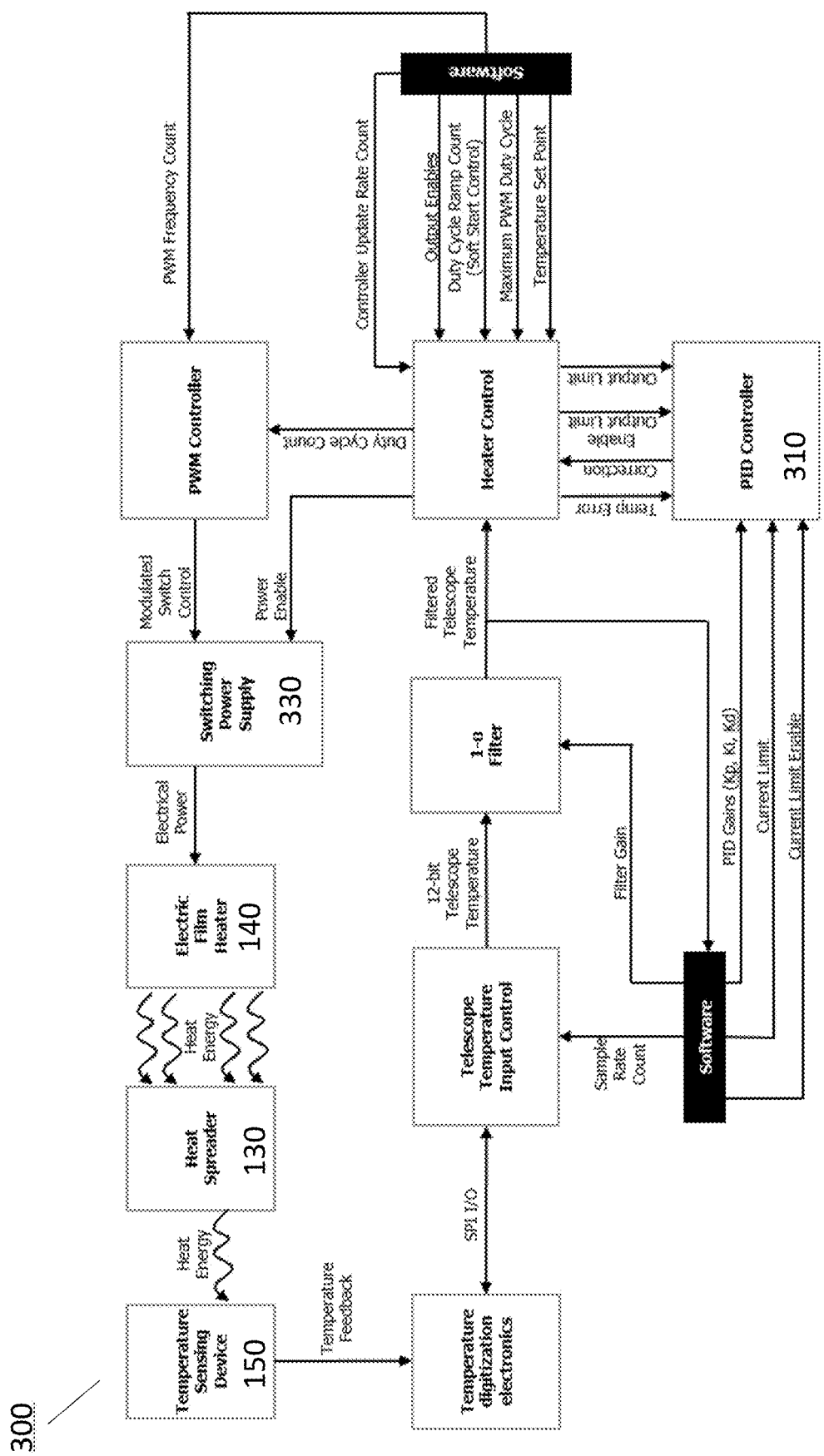
FIG. 3A is an example embodiment of a block diagram of a precision variable-focus telescope heating mechanism control loop.
Figure 3B:
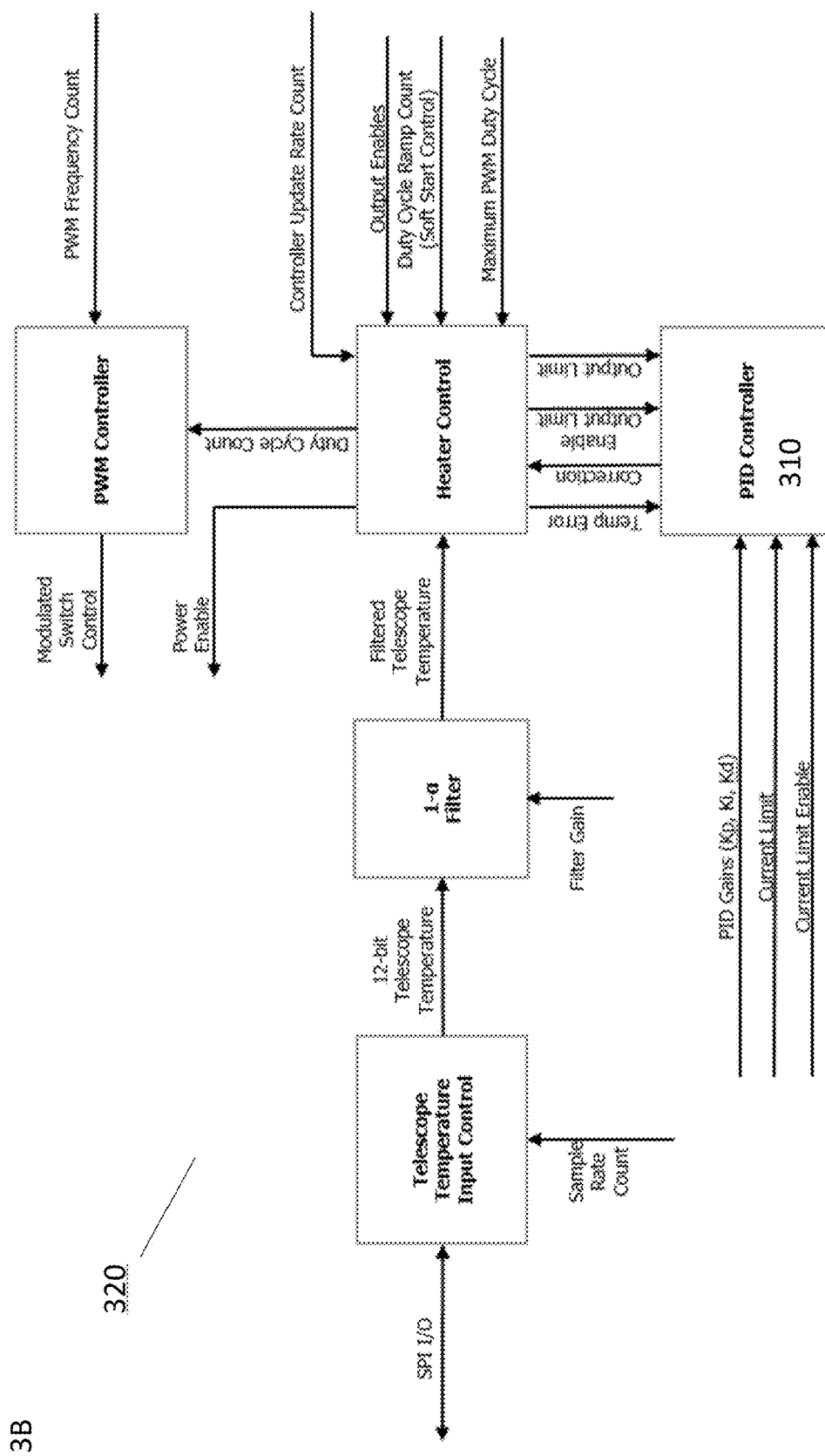
FIG. 3B is an example embodiment block diagram of a Field Programmable Gate Array (FPGA) contained within the precision variable-focus telescope heating mechanism control loop.

Turning now to FIG. 3A, therein is shown one embodiment of a precision variable-focus telescope heating mechanism control loop 300. A temperature-sensing device 150 attached to the heat spreader 130 measures the temperature of the telescope 100. The temperature feedback from the sensing device 150 is an input to temperature digitization electronics that converts the temperature feedback to a reading that can be processed. The reading is an input to the telescope temperature input control, coupled to a sample rate count, which outputs the reading as a 12-bit telescope temperature. The 12-bit telescope temperature is an input to a 1-a filter unit that applies filter gain. The filtered telescope temperature is an input to the heater control. The temperature measurement is also an input to a Proportional/Integral controller (PID controller) 310 implemented within a controller such as a Field Programmable Gate Array (FPGA) 320, as shown in FIG. 3B. A temperature calibration table is used in one embodiment to provide a more precise temperature for the telescope.

Referring to FIG. 3B, the output of the PID controller 310 feeds the input to a switching power supply 330. By way of example, the switching power supply may be a "buck" (step-down), "boost," "buck-boost," "isolated," or "non-isolated" switching power supply. This switching power supply 330 regulates the voltage across the electric film heater 140 that applies the heat energy to the heat spreader 130 thereby, maintaining the telescope 100 at a desired temperature to achieve diffraction-limited performance. In one embodiment, the temperature set-point for the control loop 300 is "user-settable" through a digital interface.

Figure 3C:
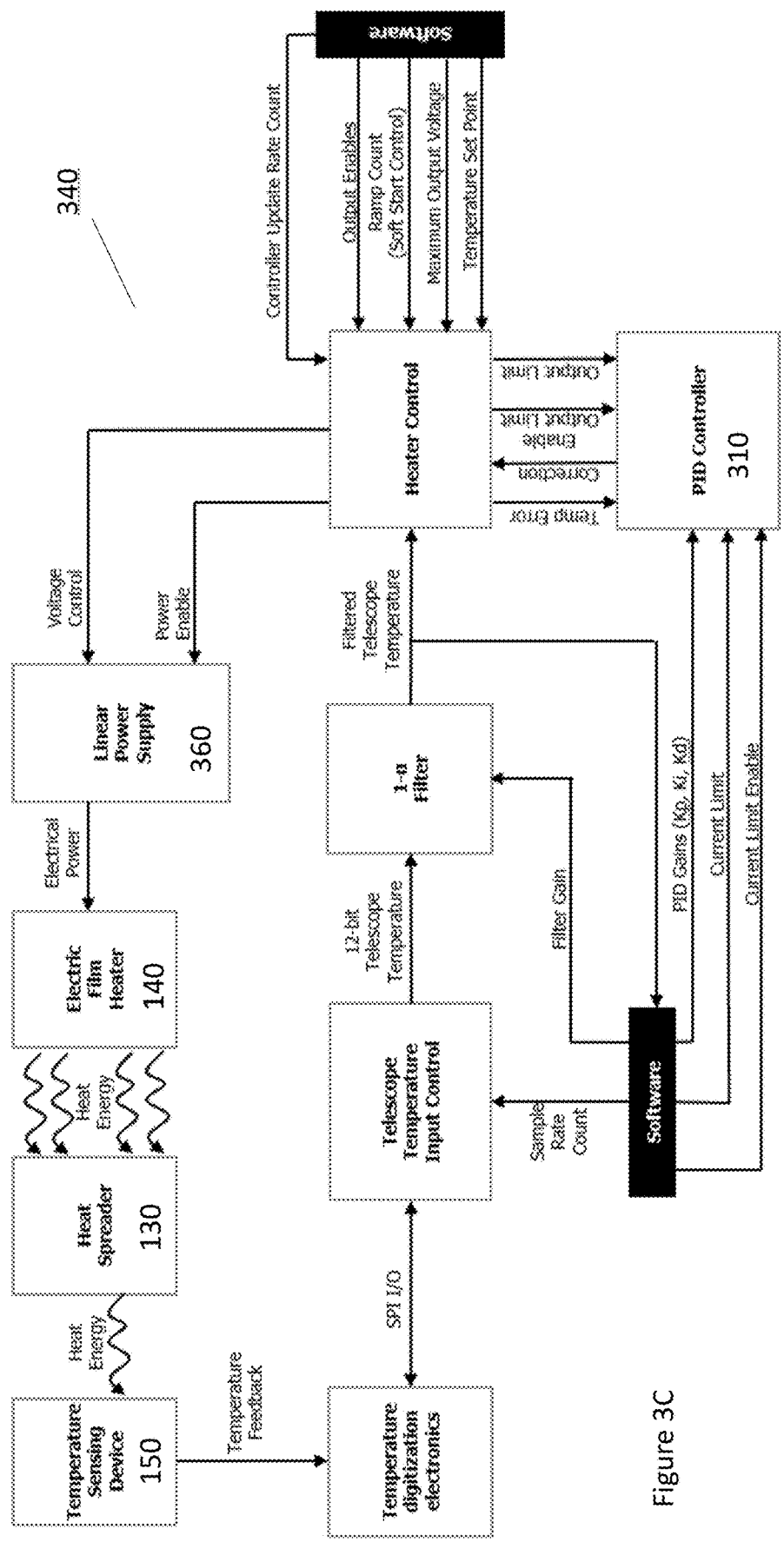
FIG. 3C is an alternative embodiment of a block diagram of a precision variable-focus telescope heating mechanism control loop.
Figure 3D:
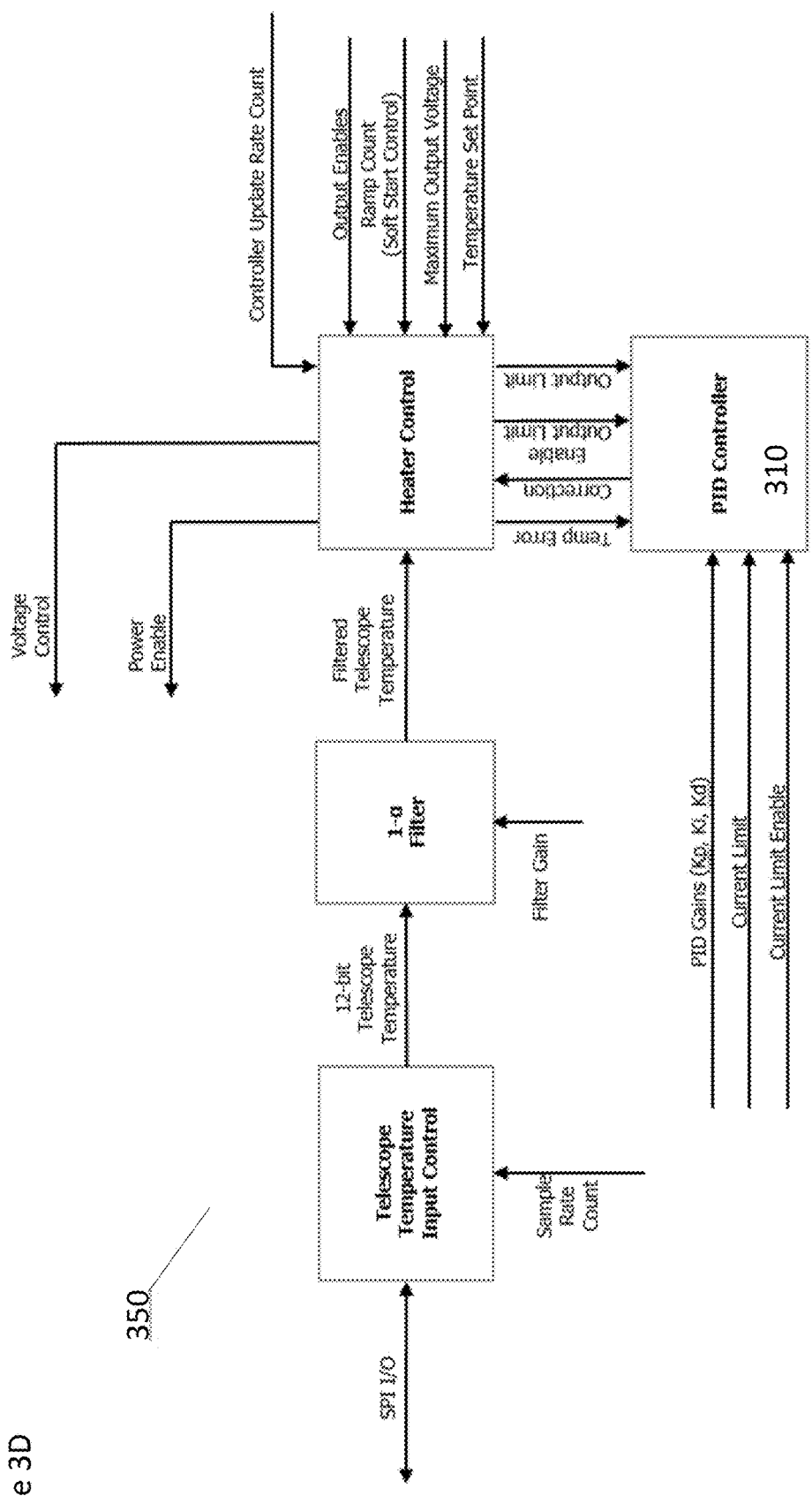
FIG. 3D is an alternative block diagram of a Field Programmable Gate Array (FPGA) contained within the precision variable-focus telescope heating mechanism control loop.

Turning now to FIG. 3C, therein is shown an alternative embodiment of a precision variable-focus telescope heating mechanism control loop 340. A temperature-sensing device 150 attached to the heat spreader 130 measures the temperature of the telescope 100. The temperature measurement is an input to a Proportional/Integral controller (PID controller) 310 implemented within a Field Programmable Gate Array (FPGA) 350, as shown in FIG. 3D. As further shown in FIG. 3D, the output of the PID controller 310 feeds the input to a linear power supply 360. This linear power supply 360 regulates the voltage across the electric film heater 140 and controls the power applied by the electric film heater 140, maintaining the telescope 100 at a desired temperature to achieve diffraction-limited performance. In one embodiment, the temperature set-point for the control loop 340 is "user-settable" through a digital interface.

Figure 4:
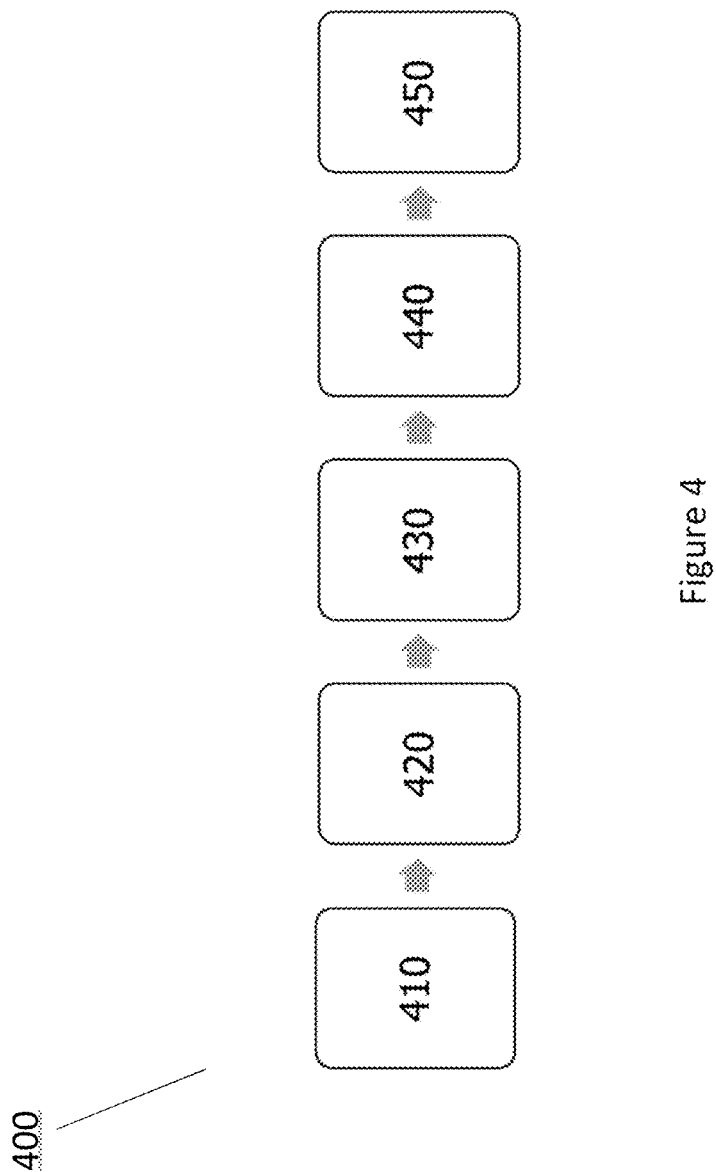
FIG. 4 is a flow diagram of a method for focusing the optical system in a precision variable-focus telescope according to one embodiment.

Turning now to FIG. 4, there is shown a method for focusing the optical system in a precision variable-focus telescope 400 according to one embodiment. This method in this example includes observing the optical prescription to get a linear performance 410. The method also includes adjusting the course adjustment of the telescope optical system to a desired focus 420. In one embodiment, initial (course) adjustment of the desired focus utilizes a traditional method of adjusting and setting of lens optics within the telescope housing 110 while the telescope is heated to an initial value. The method further includes adjusting the heater driver set point temperature for fine adjustment of the telescope optical system 430. In one embodiment, fine (precision) adjustment of focus is accomplished by modifying the temperature of the telescope until diffraction-limited performance is achieved. In various embodiments, the range of temperature used to adjust the focus is greater than the maximum environmental temperature of the air surrounding the telescope 100. The constant heat flow into the telescope 100 eliminates the need to use cooling to maintain temperature. The method includes maintaining the heater driver set point temperature for diffraction-limited performance over a wide temperature environment 440. The method may also include characterizing the temperature of the telescope using a heater circuit over a defined temperature range 450.

According to one example, the heater maintains the temperature of the telescope housing at a certain range above ambient temperature. The temperature sensing can be measured at any region of the interior or exterior of the telescope housing for a relative reading that is correctable via calibration data. For example, a temperature of the interior of the telescope may be 10 degrees different than a temperature of the exterior of the telescope such that the system can measure at one location but can estimate the temperature at another region. By maintaining the temperature at a certain range above ambient temperature allows for a high degree of uniformity. In one example, the ambient temperature is measured or otherwise provided.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A precision variable-focus telescope, comprising:
   a telescope housing comprising an interior and an exterior, wherein the telescope housing interior contains an optical system, wherein the optical system comprises a plurality of lenses having thermo-optical coefficients with a non-zero linear relationship between defocus and temperature;
   a heat spreader comprising a first side and a second side, wherein the second side of the heat spreader is coupled to the telescope housing exterior;
   a temperature-sensing device coupled to the first side of the heat spreader;
   a heater comprising a first side and a second side, wherein the second side of the heater is coupled to the first side of the heat spreader; and
   a gap pad having low thermal impedance disposed between the telescope housing exterior and the heat spreader.

2. The precision variable-focus telescope of claim 1, wherein the gap pad comprises a material with a low thermal impedance.

3. The precision variable-focus telescope of claim 1, wherein the second side of the heater is coupled to the first side of the heat spreader by a pressure-sensitive adhesive.

4. The precision variable-focus telescope of claim 1, wherein the heat spreader comprises aluminum.

5. The precision variable-focus telescope of claim 1, wherein the heater comprises a polyimide foil.

6. The precision variable-focus telescope of claim 1, wherein the gap pad is contiguous with the heat spreader.

7. The precision variable-focus telescope of claim 1, wherein the heater is contiguous with the heat spreader.

8. The precision variable-focus telescope of claim 1, wherein the temperature-sensing device comprises a thermistor.

9. The precision variable-focus telescope of claim 1, wherein the heater spreader substantially surrounds the telescope housing exterior.

10. A precision variable-focus telescope comprising:
a heat spreader comprising a first side and a second side, wherein the second side of the heat spreader is coupled to a telescope housing, wherein the telescope housing contains an optical system, wherein the optical system comprises a plurality of lenses having thermo-optical coefficients with a non-zero linear relationship between defocus and temperature;
at least one temperature sensing device coupled to a section of the first side of the heat spreader;
at least one electric-film heater comprising a first side and a second side, wherein the second side of the electric-film heater is coupled to a section the first side of the heat spreader; and
a gap pad having low thermal impedance, wherein the gap pad is sandwiched between the telescope housing and the second side of the heat spreader.

11. The precision variable-focus telescope of claim 10, wherein the gap pad comprises a material with a low thermal impedance.

12. The precision variable-focus telescope of claim 10, wherein the second side of the electric-film heater is coupled to the first side of the heat spreader by a pressure-sensitive adhesive.

13. The precision variable-focus telescope of claim 10, wherein the electric-film heater comprises a polyimide foil.

14. The precision variable-focus telescope of claim 10, wherein the gap pad is contiguous with the heat spreader.

15. The precision variable-focus telescope of claim 10, where the electric-film heater is contiguous with the heat spreader.

16. The precision variable-focus telescope of claim 10, wherein the electric-film heater substantially surrounds the telescope housing.

17. The precision variable-focus telescope of claim 10, further comprising a controller is communicatively coupled to the electric film heater and the temperature sensing device, wherein the controller maintains a desired temperature to achieve diffraction-limited performance.

18. A precision variable-focus telescope heating mechanism control loop comprising:
a heater;
a heat spreader;
a temperature-sensing device attached to the heat spreader;
a controller, wherein the controller receives a digitized temperature from the temperature sensing device;
a proportional/integral controller (PID controller) comprising an input and output, wherein the PID controller is implemented by the controller; and
a linear power supply comprising an input and output, wherein the input of the linear power supply receives the output signal from the PID controller; wherein the linear power supply output regulates a voltage across the heater and controls a power applied to the heater, maintaining a telescope at a desired temperature to achieve diffraction-limited performance, wherein the telescope comprises a plurality of lenses having thermo-optical coefficients with a non-zero linear relationship between defocus and temperature.

* * * * *